United States Patent [19]
Hikasa et al.

[11] Patent Number: 5,427,864
[45] Date of Patent: Jun. 27, 1995

[54] MULTILAYER MOLDED ARTICLE

[75] Inventors: Tadashi Hikasa; Hiroaki Mendori, both of Chiba; Takahisa Hara; Nobuhiro Usui, both of Osaka, all of Japan

[73] Assignee: Sumitomo Chemical Company, Limited, Osaka, Japan

[21] Appl. No.: 221,533

[22] Filed: Mar. 31, 1994

Related U.S. Application Data

[63] Continuation-in-part of Ser. No. 729,200, Jul. 12, 1991, abandoned.

[30] Foreign Application Priority Data

Jul. 13, 1990 [JP] Japan .................... 2-185932

[51] Int. Cl.⁶ .............................. B32B 27/32
[52] U.S. Cl. ......................... 428/521; 428/161; 428/500; 428/516; 428/519
[58] Field of Search ............ 264/259, 266, 267; 428/500, 516, 519, 521, 161

[56] References Cited

U.S. PATENT DOCUMENTS 4,913,976 4/1990 Brooks et al. .................. 428/494

FOREIGN PATENT DOCUMENTS 0186016  7/1986  European Pat. Off. .
0335264 10/1989  European Pat. Off. .
0338860 10/1989  European Pat. Off. .
0360577  3/1990  European Pat. Off. .
59-083633 5/1984  Japan .

OTHER PUBLICATIONS

"Viscoelastic Properties of Polymers" by John D. Ferry; Third Edition; pp. 1–31, 1980.
"Rheometrics—Understanding Rheological Testing"—Thermoplastics Rheometrics, Inc., 1990—pp. 1–22.

Primary Examiner—D. S. Nakarani

[57] ABSTRACT

A multilayer molded article comprising a body of a thermoplastic resin and a skin material which is laminated on a surface of said body and comprises an olefin thermoplastic elastomer having a complex viscosity ($\eta^*$) of from $1.0 \times 10^4$ to $5.0 \times 10^4$ poises at 200° C. and a vibrational angular velocity of 100 rad/sec. and a Newtonean viscosity index (n) of from 0.6 to 0.8 in a vibrational angular velocity range between 50 and 200 rad/sec. both measured by a dynamic viscoelasticity measurement, which has good appearance.

3 Claims, 1 Drawing Sheet ized designs of the mold are precisely transferred

MULTILAYER MOLDED ARTICLE

This application is a continuation-in-part, of application Ser. No. 07/729,200 filed on Jul. 12, 1991, now abandoned.

BACKGROUND OF THE INVENTION

1. Field of the Invention

The present invention relates to a multilayer molded article and a method for producing the same. In particular, the present invention relates to a thermoplastic resin molded article having a skin material layer, which article has good appearance and is used as an automobile interior panel or an electric appliances, and a method for producing such molded article.

2. Description of the Related Art

There are widely known high-grade molded articles which have improved beauty and softness by laminating a skin material thereon. As the skin material, a film or sheet of soft polyvinyl chloride or a thermoplastic elastomer can be used.

As a method for producing a multilayer molded article having a skin material, there is a method comprising forming a molded article of a thermoplastic resin by a conventional molding method such as injection molding and then forming the skin material on the molded article by, for example, vacuum molding, or simultaneously forming the molded article and the skin material with laminating the skin material to the article with an adhesive.

Alternatively, the multilayer molded article can be produced by placing the skin material in a mold, closing the mold, then injecting a molten thermoplastic resin in a mold cavity through a gate of the mold to laminate the resin with the skin material, cooling the mold and opening the mold to remove the molded article. In connection with this method, it is known to use a mold having ornamental designs on its inner wall so as to transfer such designs to a surface layer of a skin material comprising the surface layer and a foam layer and improve the appearance of the molded article (cf. Japanese Patent Kokai Publication No. 83633/1984).

However, in the method comprising supplying a thermoplastic resin melt onto the skin material which comprises the surface layer and the foam layer so as to transfer the ornamental designs of the mold to the skin material, since molding conditions including a mold temperature, a temperature of the thermoplastic resin and a molding pressure are very severe, the foam layer is crushed to a large extent and defective moldings are often found.

When the skin material having no backing foam layer is used, the skin material is strongly pressed against the mold by the thermoplastic resin melt at high temperature and high pressure, its surface is discolored and designs of the skin material are deformed so that the appearance of the molded article tends to be deteriorated.

SUMMARY OF THE INVENTION

In view of the above problems, as a result of the extensive study, the present inventors have found that partial thinning or breakage of a skin material is prevented and designs of the mold are precisely transferred to a molded article by using a skin material made of a thermoplastic elastomer having a specific melt viscosity, and have completed the present invention.

Accordingly, the present invention provides a multilayer molded article produced by placing, between unclosed male and female molds, a skin material comprising an olefin thermoplastic elastomer having a complex viscosity ($\eta^*$) of from $1.0 \times 10^4$ to $5.0 \times 10^4$ poises at 200° C. and at vibrational angular velocity of 100 rad/sec. and a Newtonean viscosity index (n) of from 0.6 to 0.8 in a vibrational angular velocity range between 50 and 200 rad/sec. both measured by a dynamic viscoelasticity measurement, supplying a thermoplastic resin melt between said skin material and either of said male and female molds, and closing said male and female molds to integrally bond said skin material and said thermoplastic resin, and a method for producing the same.

DETAILED DESCRIPTION OF THE DRAWINGS

The thermoplastic elastomer to be used as the skin material has flow characteristics such as a complex viscosity ($\eta^*$) of from $1.0 \times 10^4$ to $5.0 \times 10^4$ poises, preferably from $1.3 \times 10^4$ to $2.5 \times 10^4$ poises at 200° C. and at vibrational angular velocity of 100 rad/sec., and a Newtonean viscosity index (n) of from 0.6 to 0.8, preferably from 0.65 to 0.75 in a vibrational angular velocity range between 50 and 200 rad/sec. both measured by a dynamic viscoelasticity measurement.

When the dynamic viscosity ($\eta^*$) is less than $1.0 \times 10^4$ poises, a degree of shear deformation due to heat and flow of the-thermoplastic resin melt is large so that the skin material tends to be break. When it is larger than $5.0 \times 10^4$ poises, it is difficult to produce the skin material of the thermoplastic elastomer by a T-die extruder.

When the Newtonean viscosity index (n) is less than 0.6, since the flow characteristics is close to a Newtonean fluid, the skin material easily flows only by influence of heat so that it is more easily broken. When the Newtonean viscosity index is larger than 0.8, a viscosity of the elastomer in at low shear range increases to that the sheet processing by the extruder becomes difficult.

Examples of the olefin thermoplastic elastomer to be used as the skin material in the present invention are a dynamic cross-linked material of an olefin rubber such as an ethylene-propylene rubber, an ethylene-propylene-diene ter-polymer and the like and an olefin resin, or a blend of such dynamic cross-linked material and an olefin resin such as polyethylene, polypropylene and the like. A composition of such material or blend optionally containing various additives, compounding agents, pigments, softeners and the like is formed in a sheet by calendering or extrusion molding.

To improve abrasion resistance or a slip property, a film of an abrasion resistant resin such as a polyurethane or acrylic resin and engineering plastics is laminated on the sheet surface though bonding or with an adhesive, or a coating agent is applied to the sheet surface. The coating agent may be applied to the surface of the article after molding.

As the thermoplastic resin in the present invention, any thermoplastic resin which can be fusion bonded with the olefin thermoplastic elastomer to be used as the skin material and is conventionally used in compression molding, injection molding or extrusion may be used. Examples of the thermoplastic resin are polyethylene resins such as high density polyethylene, polypropylene, copolymers comprising propylene, or mixtures thereof.

To the thermoplastic resin, various fillers such as organic fillers or glass fibers, and various additives such as pigments, lubricants, antistatic agents or stabilizers may be added, if desired.

The present invention will be explained by making reference to the accompanying drawings.

Figure 1:
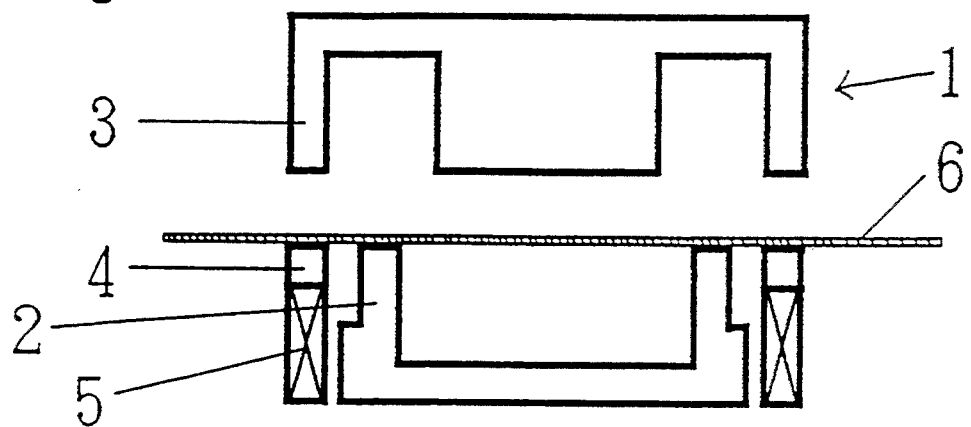
FIGS. 1 to 3 are cross sections of the apparatus in various steps of the method of the present invention.

In the present invention, (1) A thermoplastic elastomer sheet 6 as a skin material in a continuous sheet form or after cut to a suitable size is placed on a skin material-fixing frame 4 (FIG. 1).

Figure 2:
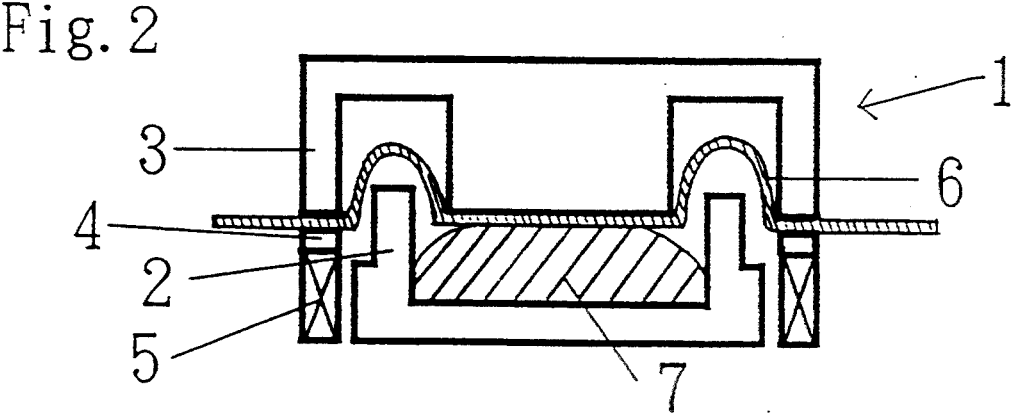

(2) Then, a female mold 3 is lowered, and the thermoplastic elastomer sheet 6 is held between the skin material-fixing frame 4 and the female mold 3 with a suitable clamping force. Thereafter, a resin melt 7 is supplied between the thermoplastic elastomer sheet 6 and a male mold 2 through a resin melt passage formed in the male mold 2 while the female mold 3 and the male mold 2 are still unclosed (FIG. 2).

(3) When the female mold 3 and the skin material-fixing frame 4 are lowered, the resin melt 7 flows to press the thermoplastic elastomer sheet 6 against the female mold 3, whereby the thermoplastic elastomer sheet 6 is tugged in concaves of the female mold while a peripheral part of the thermoplastic elastomer 6 slides between the skin material-fixing frame 4 and the female mold 3 and the thermoplastic elastomer sheet is expanded.

Figure 3:
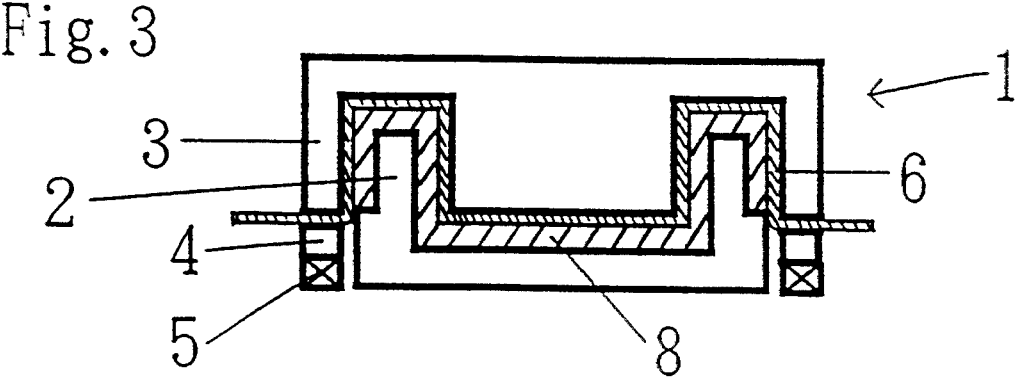

(4) As the female mold 3 and the skin material-fixing frame are further lowered, the male and female molds 2, 3 are completely closed, the thermoplastic elastomer sheet 6 and the thermoplastic resin 8 are integrated together, and the molding is finished (FIG. 3).

(5) After cooling, the female mold 3 is lifted, and the multilayer molded article comprising the skin material 6 and thermoplastic resin 8 which are integrally laminated is removed.

In the present invention, usually, the skin material having a thickness of 0.3 to 1.2 mm is placed between the unclosed male and female molds at a temperature of 20° to 120° C., the melt of the thermoplastic resin heated at a temperature of 180° to 230° C. is supplied on the foam layer side of the skin material, the molds are closed, and the resin and the skin materials are molded under a pressing pressure of 20 to 150 kg/cm². Thereby, the laminated molded article having exactly transferred ornamental designs of the mold such as emboss, satin or hairlines is produced.

The above description illustrates an example of the molding method of the present invention, and preheating of the skin material, presence or absence of premolding, positions of the male and female molds, presence or absence of the skin material-fixing frame, a manner for supplying the resin melt or a mold design for treating edge parts can be freely selected within the scope of the present invention.

EXAMPLES

To explain the present invention further in detail, Examples will be presented. In Examples, the properties are measured by the following methods:

(1) Tensile properties

Modulus at 100% elongation (M100), tensile strength at break ($T_B$) and elongation at break ($E_B$) are measured according to JIS K 6301.

(2) Flow characteristics

Using a parallel plate type dynamic viscoelasticity measurement apparatus (manufactured by Rheometrix), dependency of a complex viscosity ($\eta^*$) on the vibrational angular velocity is measured.

A Newtonean viscosity index (n) is calculated from the result of the above experiment according to the following equation:

$$n = [log\eta^*(50) - log\eta^*(200)]/[log200 - log50]$$

in which $\eta^*(50)$ and $\eta^*(200)$ are complex viscosities at vibrational angular velocities of 50 rad/sec. and 200 rad/sec., respectively.

| | |
|---|---|
| Vibrational angular velocity: (rotational speed) | 1–200 rad/sec. |
| Rotational displacement: | 5 % |
| Atmospheric temperature: | 200° C. or 250° C. |

Example 1

In a Mixtron BB-16 (manufactured by Kobe Steel, Ltd.), 70 parts by weight of an oil-extended EPDM rubber (Mooney viscosity ($ML_{1+4}$ 100° C.) = 78) which consisted of 100 parts by weight of an ethylene-propylene-ethylidenenorbornene copolymer rubber (propylene content: 28% by weight, iodine value: 12) and 100 parts by weight of a mineral oil base softener (Dynaprocess (a trade mark) PW 380 manufactured by Idemitsu Kosan), 30 parts by weight of random polypropylene (ethylene content: 4.5% by weight, MFR (230° C., 2.16 kg) = 1.3 g/10 min.) and 0.4 part by weight of a cross-linking aid (Sumifine BM (a trade mark) manufactured by Sumitomo Chemical Co., Ltd.) were mixed for 10 minutes and extruded to produce a particulate composition. To 100 parts by weight of the composition, 0.04 part by weight of 2,5-dimethyl-2,5-di-tert.-butylperoxyhexane was added and dynamically cross linked at 220° C. for one minute with a twin-screw kneader (TEX-44 manufactured by Nippon Seikosho) to prepare a thermoplastic elastomer. The properties of the thermoplastic elastomer were as follows:

Tensile properties

M100 = 33 kg/cm²

$T_B$ = 145 kg/cm²

$E_B$ = 730%

Flow characteristics (at 200° C.)

$\eta^* = 1.3 \times 10^4$ poises at vibrational angular velocity of 100 rad/sec.

n = 0.72

The thermoplastic elastomer was T-die extruded with an extruder of 40 mm in diameter at 220° C. to form a sheet having a thickness of 0.6 mm.

As a skin material, this sheet was placed in the unclosed mold consisting of a female mold having engraved designs on its inner wall, and polypropylene (Sumitomo Noblen AZ 564 manufactured by Sumitomo Chemical Co., Ltd.) which had been molten and plasticized at 200° C. through a resin passage provided in the lower male mold. Thereafter, the mold was closed to effect molding of the resin. The molded article had clearly transferred designs of the female mold and no breakage of the skin layer foam layer, and a multilayer article with good appearance was obtained.

Example 2

In a Mixtron BB-16 (manufactured by Kobe Steel, Ltd.), 40 parts by weight of an oil-extended EPDM rubber (Mooney viscosity ($ML_{1+4}$ 100° C.)=78) which consisted of 100 parts by weight of an ethylene-propylene-ethylidenenorbornene copolymer rubber (propylene content: 30% by weight, iodine value: 10) and 40 parts by weight of a mineral oil base softener (Dynaprocess (a trade mark) PW 380 manufactured by Idemitsu Kosan), 40 parts by weight of an ethylenepropylene copolymer (propylene content: 53%, Mooney viscosity ($ML_{1+4}$ 100° C.)=43), 20 parts by weight of random polypropylene (ethylene content: 4.5% by weight, MFR (230° C., 2.16 kg)=1.3 g/10 min.) and 0.4 part by weight of a cross-linking aid (Sumifine BM (a trade mark) manufactured by Sumitomo Chemical Co., Ltd.) were mixed for 10 minutes and extruded to produce a particulate composition. To 100 parts by weight of the composition, 0.04 part by weight of 2,5-dimethyl-2,5-di-tert.-butylperoxyhexane was added and dynamically cross linked at 220° C. for one minute with a twin-screw kneader (TEX-44 manufactured by Nippon Seikosho) to prepare a thermoplastic elastomer. The properties of the thermoplastic elastomer were as follows:

Tensile properties
$M100 = 17$ kg/cm$^2$
$T_B = 44$ kg/cm$^2$
$E_B = 620\%$

Flow characteristics (at 200° C.)
$\eta^* = 1.75 \times 10^4$ poises at vibrational angular velocity of 100 rad/sec.
$n = 0.66$ The thermoplastic elastomer was T-die extruded with an extruder of 40 mm in diameter at 220° C. to form a sheet having a thickness of 0.6 mm.

In the same molding manner as in Example 1 but using this skin material, molding was carried out.

The molded article had clearly transferred designs of the female mold and no breakage of the skin layer foam layer, and a multilayer article with good appearance was obtained.

Example 3

In a Mixtron BB-16 (manufactured by Kobe Steel, Ltd.), 70 parts by weight of an oil-extended EPDM rubber (Mooney viscosity ($ML_{1+4}$ 100° C.)=78) which consisted of 100 parts by weight of an ethylene-propylene-ethylidenenorbornene copolymer rubber (propylene content: 30% by weight, iodine value: 10) and 40 parts by weight of a mineral oil base softener (Dynaprocess (a trade mark) PW 380 manufactured by Idemitsu Kosan), 30 parts by weight of random polypropylene (ethylene content: 4.5% by weight, MFR (230° C., 2.16 kg)=1.3 g/10 min.) and 0.4 part by weight of a cross-linking aid (Sumifine BM (a trade mark) manufactured by Sumitomo Chemical Co., Ltd.) were mixed for 10 minutes and extruded to produce a particulate composition. To 100 parts by weight of the composition, 0.04 part by weight of 2,5-dimethyl-2,5-di-tert.-butyl-peroxyhexane was added and dynamically cross linked at 220° C. for one minute with a twin-screw kneader (TEX-44 manufactured by Nippon Seikosho) to prepare a thermoplastic-elastomer- The properties of the thermoplastic elastomer were as follows:

Tensile properties
$M100 = 32$ kg/cm$^2$
$T_B = 146$ kg/cm$^2$
$E_B = 800\%$

Flow characteristics (at 200° C.)
$\eta^* = 2.0 \times 10^4$ poises at vibrational angular velocity of 100 rad/sec.
$n = 0.74$ Flow characteristics (at 250° C.)
$\eta^* = 1.6 \times 10^4$ poises at vibrational angular velocity of 100 rad/sec.
$n = 0.74$ The thermoplastic elastomer was T-die extruded with an extruder of 40 mm in diameter at 220° C. to form a sheet having a thickness of 0.6 mm.

As a skin material, this sheet was placed in the unclosed mold consisting of a female mold having engraved designs on its inner wall, and polypropylene (Sumitomo Noblen AZ 564 manufactured by Sumitomo Chemical Co., Ltd.) which had been molten and plasticized at 250° C. through a resin passage provided in the lower male mold. Thereafter, the mold was closed to effect molding of the resin. The molded article had clearly transferred designs of the female mold and no breakage of the skin layer foam layer, and a multilayer article with good appearance was obtained.

Comparative Example

In a Mixtron BB-16 (manufactured by Kobe Steel, Ltd.), 70 parts by weight of an oil-extended EPDM rubber (Mooney viscosity ($ML_{1+4}$ 100° C.)=53) which consisted of 100 parts by weight of an ethylene-propylene-ethylidenenorbornene copolymer rubber (propylene content: 28% by weight, iodine value: 12) and 100 parts by weight of a mineral oil base softener (Dynaprocess (a trade mark) PW 380 manufactured by Idemitsu Kosan), 30 parts by weight of random polypropylene (ethylene content: 4.5% by weight, MFR (230° C., 2.16 kg)=8.0 g/10 min.) and 0.4 part by weight of a cross-linking aid (Sumifine BM (a trade mark) manufactured by Sumitomo Chemical Co., Ltd.) were mixed for 10 minutes and extruded to produce a particulate composition. To 100 parts by weight of the composition, 0.04 part by weight of 2,5-dimethyl-2,5-di-tert.-butyl-peroxyhexane was added and dynamically cross linked at 220° C. for one minute with a twin-screw kneader (TEX-44 manufactured by Nippon Seikosho) to prepare a thermoplastic elastomer. The properties of the thermoplastic elastomer were as follows:

Tensile properties
$M100 = 30$ kg/cm$^2$
$T_B = 143$ kg/cm$^2$
$E_B = 750\%$

Flow characteristics (at 200° C.)
$\eta^* = 8.0 \times 10^3$ poises at vibrational angular velocity of 100 rad/sec.
$n = 0.65$ In the same molding steps as in Example 1 but using this skin material, molding was carried out. The skin material was broken.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multilayer molded article comprising a body of a thermoplastic resin and a skin material which is laminated on a surface of said body and comprises an olefin thermoplastic elastomer having a complex viscosity ($\eta^*$) of from $1.0 \times 10^4$ to $5.0 \times 10^4$ poises at 200° C. and a vibrational angular velocity of 100 rad/sec. and a Newtonean viscosity index (n) of from 0.6 to 0.8 in a vibrational angular velocity range between 50 and 200 rad/sec. both measured by a dynamic viscoelasticity measurement.

2. The multilayer molded article according to claim 1, wherein said complex viscosity is from $1.3 \times 10^4$ to $2.5 \times 10^4$ poises.

3. The multilayer molded article according to claim 1, wherein said Newtonean viscosity index is from 0.65 to 0.75.

* * * * *